(12) United States Patent
Saiwai

(10) Patent No.: US 11,590,570 B2
(45) Date of Patent: Feb. 28, 2023

(54) RAW MATERIAL FOR METAL POROUS BODY AND METAL POROUS BODY

(71) Applicant: MITSUBISHI MATERIALS CORPORATION, Tokyo (JP)

(72) Inventor: Toshihiko Saiwai, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 64 days.

(21) Appl. No.: 16/982,647

(22) PCT Filed: Jan. 16, 2019

(86) PCT No.: PCT/JP2019/001073
§ 371 (c)(1),
(2) Date: Sep. 21, 2020

(87) PCT Pub. No.: WO2019/181157
PCT Pub. Date: Sep. 26, 2019

(65) Prior Publication Data
US 2021/0023623 A1 Jan. 28, 2021

(30) Foreign Application Priority Data

Mar. 23, 2018 (JP) .............................. JP2018-056167

(51) Int. Cl.
| | | |
|---|---|---|
| *D07B 1/06* | (2006.01) | |
| *H01B 7/22* | (2006.01) | |
| *B22F 3/11* | (2006.01) | |
| *C22C 1/08* | (2006.01) | |
(Continued)

(52) U.S. Cl.
CPC ................. *B22F 3/11* (2013.01); *C22C 1/08* (2013.01); *D07B 1/0693* (2013.01); *B21C 47/02* (2013.01); *B21F 3/02* (2013.01); *B22F 2301/052* (2013.01); *H01B 7/226* (2013.01); *Y10T 428/12333* (2015.01); *Y10T 428/2925* (2015.01)

(58) Field of Classification Search
CPC ...... Y10T 428/12333; Y10T 428/2925; D07B 1/0693; H01B 7/226
USPC .......................................................... 428/592
See application file for complete search history.

(56) References Cited

FOREIGN PATENT DOCUMENTS

| | | |
|---|---|---|
| DE | 3421658 A1 | 12/1985 |
| EP | 3758056 A1 | 12/2020 |
| GB | 1263467 A | 2/1972 |
(Continued)

OTHER PUBLICATIONS

Watanabe et al., JP 2005/031463 A machine translation, Feb. 3, 2005, entire translation (Year: 2005).*
(Continued)

*Primary Examiner* — Humera N. Sheikh
*Assistant Examiner* — Katherine A Christy
(74) *Attorney, Agent, or Firm* — Locke Lord LLP

(57) ABSTRACT

A material for porous metal body having a coil shape of a wire material wound in a helical shape, made of metal which having good thermal conductivity and can join by sintering; an average wire diameter Dw of the wire material is 0.05 mm to 2.00 mm inclusive, an average coil outer diameter Dc is 0.5 mm to 10.0 mm inclusive, a coil length L of 1 mm to 20 mm inclusive, and a winding number N is 1 to 10; and the plurality of materials for porous metal body are combined and sintered to form a metal porous body having a plurality of pores so that a pore ratio of the metal porous body is facilitated to be controlled.

11 Claims, 6 Drawing Sheets

(51) Int. Cl.
  *B21C 47/02* (2006.01)
  *B21F 3/02* (2006.01)

(56) References Cited

FOREIGN PATENT DOCUMENTS

| JP | 2003-105407 A | 4/2003 |
| JP | 2005-031463 A | 2/2005 |
| JP | 2006-307295 A | 11/2006 |
| JP | 2010-236078 A | 10/2010 |
| JP | 2011-15959 A | 1/2011 |
| JP | 2016-108622 A | 6/2016 |

OTHER PUBLICATIONS

Shima et al., JP 2011/015959 A machine translation, Jan. 27, 2011, entire translation (Year: 2011).*
International Search Report dated Mar. 26, 2019, issued for PCT/JP2019/001073.
Supplementary European Search Report dated Sep. 2, 2021, issued for European Patent Application No. 19771114.6.
K. Nakayama, "Classification of chips", Seimitsu Kikai, vol. 42, No. 2, Feb. 1976, pp. 8-14 and partial translation thereof (cited in the Aug. 16, 2021 third party submission).
"The Society of Environmental Resources Engineering, The 126th Anual Meeting, The forefront of energy and environmental technology, Example of MCG grinding," Jun. 2, 2011 Lecture, pp. 1-17 and partial translation thereof. (cited in the Aug. 16, 2021 third party submission).

* cited by examiner

RAW MATERIAL FOR METAL POROUS BODY AND METAL POROUS BODY

BACKGROUND OF THE INVENTION

Technical Field

The present invention relates to a raw material for a metal porous body used for forming a metal porous body having a plurality of pores and the metal porous body.

Priority is claimed on Japanese Patent Application No. 2018-056167, filed Mar. 23, 2018, the content of which is incorporated herein by reference.

Background Art

Various methods are suggested for manufacturing metal porous bodies having isotropy, anisotropy, or lopsidedness.

For example, Patent Document 1 discloses a sinter-formed body with a porous structure formed by sintering stainless steel fibers having an average equivalent diameter of 5 to 50 μm and an average length of 30 to 2000 times of the diameter with random distribution. The sinter-formed body having the random distribution of the fibers like this is generally an isotropic metal porous body.

Patent Document 2 discloses an energy absorption porous member in which metal fibers are arranged in two-dimensional multi directions (random) or one direction and sintered. It is also described in Patent Document 2 that a machinery property of the energy absorption porous member is anisotropic (with a directionality), and a plateau stress is high even with a small volume content by relating a direction of an external stress, a direction of an alignment surface of the fibers, and an alignment direction, so it enables to absorb energy efficiently.

Patent Document 3 discloses a method of manufacturing a porous material using porous metal and clay composition for porous ceramic to give a distribution on a porous size and a porosity, e.g., a lopsidedness distribution, so that the pores have a directionality. In this Patent Document 3, the clay composition in which gelling agent is added to slurry is used. This slurry includes followings: water solution of binder, metal powder or ceramic powder, and a pore-forming material consisting of at least one resin among foamed resin, hollow resin, and solid resin. It is described to manufacture the porous material by molding this clay composition and drying it, and then sintering to remove the pore-forming material. Moreover, it is also described to manufacture a porous material in which the porous rate shows inclined distribution in a thickness direction by stacking two or more types of the clay composition which are different in a content ratio of the pore-forming material so that the content ratio of the pore-forming material shows inclined distribution in a stacking direction.

CITATION LIST

Patent Literature

Patent Document 1: Japanese Unexamined Patent Application, First Publication No. 2010-236078
Patent Document 2: Japanese Unexamined Patent Application, First Publication No. 2003-105407
Patent Document 3: Japanese Unexamined Patent Application, First Publication No. 2006-307295

SUMMARY OF INVENTION

Technical Problem

However, as described in Patent Document 1, if a length of the fibers is long, the fibers are stacked and planarly oriented, so it is difficult to obtain pores with isotropic arrangement. Generally, the longer the fibers are, the larger the size is and the more shape is flat of the pores, so it is difficult to manufacture the isotropic metal porous body.

As described in Patent Document 2, if an aspect ratio of the fiber length and the fiber diameter is not set in a suitable range, it is not possible to obtain a prescribed volume content (a pore ratio) and a prescribed cell size (a fiber interval, a pore size).

As described in Patent Document 3, it requires much labor to manufacture the metal porous body by a method of making clay composition with various properties and stacking them, then drying and sintering.

The present invention is achieved in consideration of the above circumstances, and has an object to provide a material for metal porous body and the metal porous body in which directionality (isotropy, anisotropy, or lopsidedness) of the metal porous body with pores can be easily controlled.

Solution to Problem

A material for metal porous body of the present invention is a material for metal porous body forming a metal porous body having a plurality of pores, and is coil-shaped wire material wound in a spiral shape.

Since the material for metal porous body is formed into the coil shape, it is easy to handle the material for metal porous body. Accordingly, without careful attention, it is easy to control not only the pore ratio and the pore size of the metal porous body but distribution of them, by the plurality of materials for a metal porous material being stacked and filled by a feeder, a robotic arm and the like at any point and to any direction. Accordingly, it is easy to manufacture the porous metal body having any directionality (isotropy, anisotropy, or lopsidedness).

As a preferred aspect of the material for metal porous body of the present invention, it is preferable that the wire material have an average wire diameter Dw of 0.05 mm to 2.00 mm inclusive, the coil shape have an average coil outer diameter Dc of 0.5 mm to 10.0 mm inclusive, a coil length L of 1 mm to 20 mm inclusive, and a winding number N 1 to 10 inclusive.

Since the average coil outer diameter Dc, the coil length L, the winding number N and the average wire diameter D2 of the material for metal porous body are in the above explained range, it facilitates to manufacture various metal porous body and purposes of the material for metal porous body can be increased.

If the average coil outer diameter Dc is less than 0.5 mm, it is difficult to hold the material for metal porous body by a robotic arm and the like when treating it, so that it is hard to arrange it in an intended position and direction. If the average coil outer diameter Dc is more than 10.0 mm, interval between the materials for metal porous body being in contact with each other tends to be large when the materials for metal porous body are aligned; and it is concerned that the porosity of the metal porous body is far from an assumption from the porosity of the material for metal porous body, and the porosity cannot be stably controlled.

The coil length L is too short if it is less than 1 mm, and it is difficult to convey the material for metal porous body with stably maintaining the posture (a position and a direction) when conveying by a feeder and the like. If the coil length L is more than 20 mm, the position and the direction of the material for metal porous body are unstable while conveying, and it is difficult to convey the material for metal porous body with stably maintaining the posture.

If the winding number N is less than 1, three-dimensional coil shape cannot be obtained, so that it is difficult to maintain a sufficient pore size and the porosity when arranging the material for metal porous body. If the winding number N is more than 10, manufacturing difficulty of the coil shape is high, so that a manufacturing cost is high and it is not suitable for mass production.

If the average wire diameter Dw is less than 0.05 mm, the wire diameter of the wire material is thin, so that the manufacturing difficulty of the coil shape is high and it is not suitable for mass production. The productivity is high when the average wire diameter Dw is not less than 0.1 mm, so that it is more preferable that the average wire diameter be not less than 0.1 mm. If the average wire diameter Dw of the wire material is more than 2.00 mm, the interval between the materials for metal porous body being in contact with each other tends to large when the materials for metal porous body are aligned; and it is concerned that the porosity of the metal porous body is far from an assumption from the porosity of the material for metal porous body, and the porosity cannot be stably controlled.

As a preferred aspect of the material for metal porous body of the present invention, it is preferable that in a state in which one end thereof along a direction following the coil length L is supported in a cantilever manner and the other end is deflected with a deflection amount $\delta$ by an own weight, a deflection ratio ($\delta$/L) of the coil length L and the deflection amount $\delta$ be not more than 0.20.

If the deflection ratio ($\delta$/L) is more than 0.20 (20%), the material for metal porous body is easy to be deformed when handled by a robotic arm and the like and it is difficult to manufacture the metal porous body having desired directionality.

As a preferred aspect of the material for metal porous body of the present invention, it is preferable that an aspect ratio (L/Dc) of the average coil outer diameter Dc and the coil length L be not less than 0.1 and not more than 10.0.

If the aspect ratio is less than 0.1 or more than 10.0, it may be difficult to stably arrange the material for metal porous body depending on the position and the direction, and it is difficult to manufacture the metal porous body having desired directionality.

As a preferred aspect of the material for metal porous body of the present invention, it is preferable that a porosity Q of the material for metal porous body be not less than 30.0% and not more than 99.9%, where an occupied volume Vc (mm$^3$) is $[L \times \pi \times (Dc/2)^2]$; a material volume Vw (mm$^3$) is $\{[\pi \times (Dw/2)^2] \times (Dc-Dw) \times \pi \times N\}$; and the porosity Q (%) is $[1-(Vw/Vc)] \times 100$.

If the porosity Q of the material for metal porous body is set to be smaller than 30.0%, an inside (an inner diameter of the coil) of the coil shape is small and it is difficult to manufacture the metal porous body having sufficient space. If the porosity Q is larger than 99.9%, an own strength of the material for metal porous body is low and there is a concern of breakage while conveying in the feeder and the like.

As a preferred aspect of the material for metal porous body of the present invention, it is preferable that a pitch ratio (P/Dw) of a pitch P and the average wire diameter Dw be not less than 1 and not more than 50, where the pitch P is an interval between turns in a direction of the coil length L.

If the pitch ratio (P/Dw) is less than one, the pitch P is smaller than the average wire diameter Dw and opening of the coil shape is too small. Therefore, the materials for metal porous body are less entangled when combined. Accordingly, when the metal porous body is manufactured, there are few joined portions of the materials for metal porous body with each other and the strength is low, so that stability of the shape may be deteriorated.

If the pitch ratio (P/Dw) is more than 50, the pitch P is too large, so that the coil shape of the other material for a metal porous material easily enters in the coil shape of the material for metal porous body; and it is concerned that the porosity of the metal porous body is far from an assumption from the porosity of the material for metal porous body, and the porosity cannot be stably controlled.

As a preferred aspect of the material for metal porous body of the present invention, it is preferable that a cross sectional shape of the wire material be a polygon with six or less corner parts and a curvature radius (a corner-R: a roundness of the corner parts) of the corner parts be not more than 0.1 mm.

If the corners in the cross sectional shape of the wire material is six or less, i.e., the cross sectional shape of the wire material is a hexagon or less, the wire material has a lot of flat surfaces; and if the curvature radius of the corner parts is 0.1 mm or less, an area of the flat parts is large: therefore it is possible to enlarge a contact area of the materials for metal porous body when being in contact with each other and to enlarge the joined parts of the materials for metal porous body in the metal porous body. Accordingly, it is possible to improve mechanical property such as stretching, pressurizing and the like and thermal characteristics such as heat transfer property in the metal porous body.

A metal porous body of the present invention is formed by combining and sintering the plurality of materials for metal porous body.

In the metal porous body manufactured by combining the materials for metal porous body of the present invention, it is easy to control the directionality (isotropy, anisotropy, and lopsidedness).

Advantageous Effects of Invention

According to the present invention, it is possible to provide a material for metal porous body having various purposes and to control the directionality (isotropy, anisotropy, and lopsidedness) of the metal porous body with ease.

DESCRIPTION OF EMBODIMENTS

Figure 1:
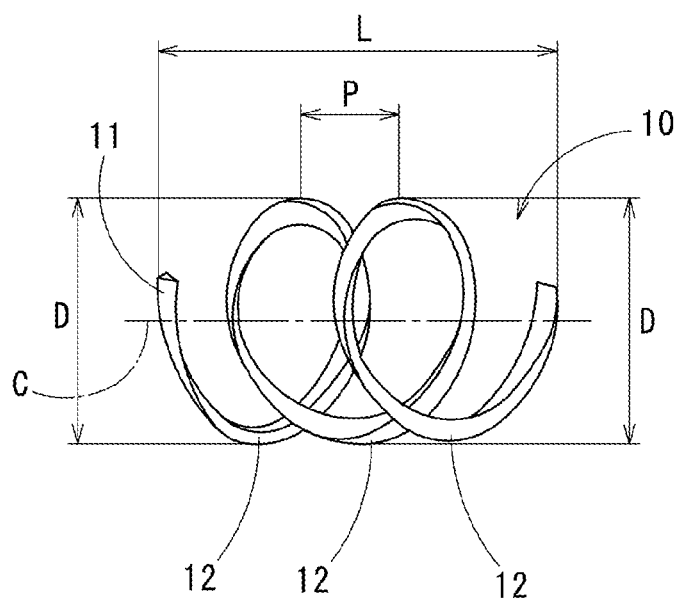
FIG. 1 It is a schematic view of a material for metal porous body of the present invention.
Figure 9:
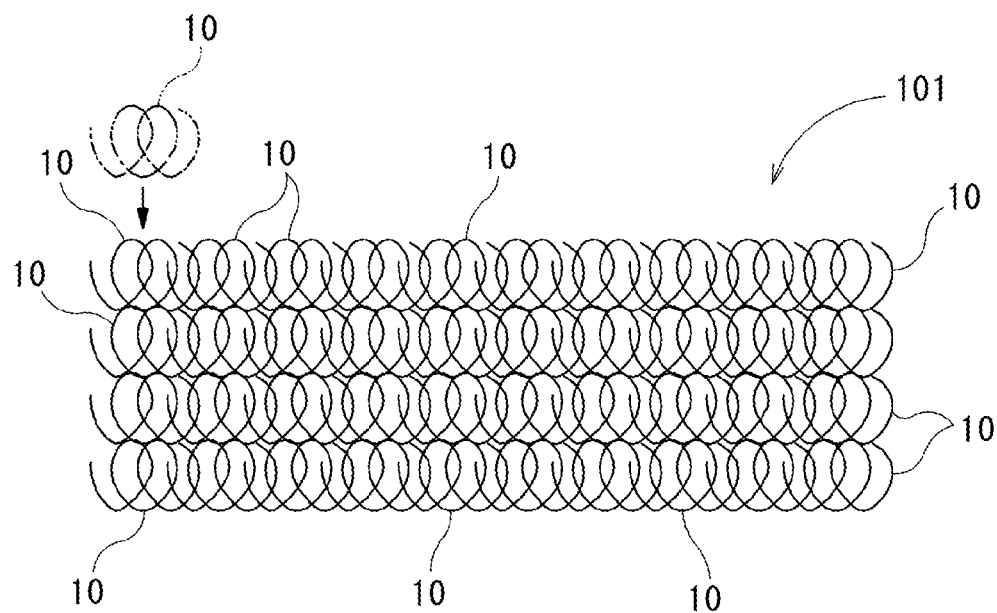
FIG. 9 It is a schematic view explaining a metal porous body formed by combining a plurality of the materials for metal porous body shown in FIG. 1.

Below, embodiments of the present invention will be explained. FIG. 1 shows a material for metal porous body 10 of an embodiment of the present invention. FIG. 9 shows a metal porous body 101 manufactured by using the materials for metal porous body 10. As shown in the schematic view in FIG. 9, the plurality of materials for metal porous body 10 are used by being combined for manufacturing the metal porous body 101 having a plurality of pores.

—Structure of Material for Metal Porous Body—

Figure 2:
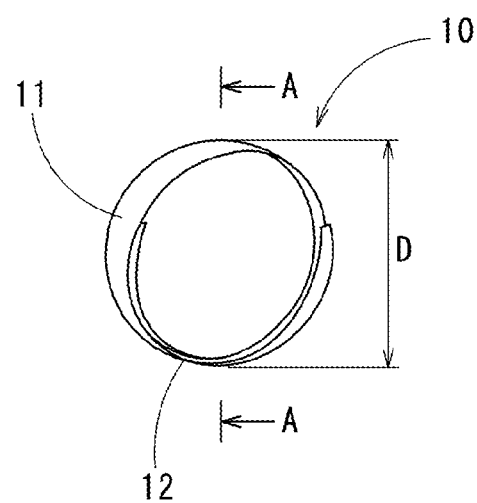
FIG. 2 It is a side view of the material for metal porous body shown in FIG. 1 in an axial direction.

As shown in the schematic view in FIG. 1 and FIG. 2, the material for metal porous body 10 is a small piece having a coil shape in which a wire-shaped wire material 11 made of metal material is wound in a helical shape. The wire material 11 is made of metal material having high thermal conductivity and bondable by sintering: for example, aluminum and aluminum alloy can be suitably used.

Figure 3:
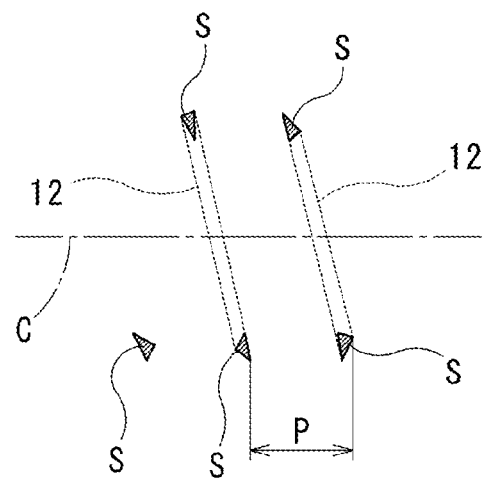
FIG. 3 It is an end view taken along the line A-A of the material for metal porous body shown in FIG. 2.
Figure 4:
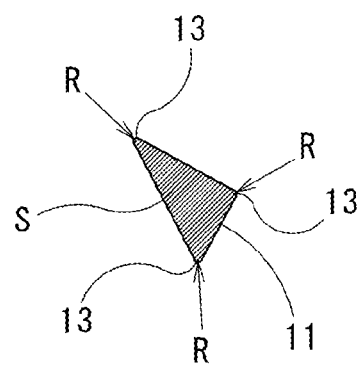
FIG. 4 It is a lateral cross sectional view of a wire material shown in FIG. 1.

A cross sectional shape (a lateral cross section) of the wire material 11 forming the material for metal porous body 10 is not limited to a perfect circle; it may be a triangle shape as shown in FIG. 3 and FIG. 4, for example. The cross sectional shape of the wire material 11 is a polygon with six or less corner parts 13 as shown in FIG. 4. It is desirable that a radius curvature R of the corner parts 13 is not more than 0.1 mm at an outer surface. The corner parts 13 in the cross sectional shape of the wire material 11 is six or less, i.e., the cross sectional shape of the wire material 11 is a hexagon or less, so that the wire material 11 has a large gentle bend surface with the radius curvature 2.5 mm or larger; as a result, it is possible to enlarge a contact area of the materials for metal porous body 10 are in contact with each other, and a bonded part between the material for metal porous body 10 when the metal porous body 101 is manufactured.

The material for metal porous body 10 in the present embodiment is not a perfect coil shape, but formed to be twisted as a whole. The cross sectional shape of the wire material 11 is not limited to an even and same shape over a whole length. Therefore, as shown in FIG. 3, the cross sectional shape and a section area S of the wire material 11 may be different in accordance with a position of the length direction (an axis direction of the material for metal porous body 10.

Since the cross sectional shape and the section area S of the wire material 11 are different in accordance with a measured position, in the present embodiment, an equivalent circle diameter (which is a diameter of a circle having the same area as the section area S) is calculated from the section area S of the wire material 11 at prescribed position, and this value is considered as a wire diameter at this position. Evaluation of the wire material 11 is carried out by an average value of the wire diameters (an average wire diameter Dw) measured at prescribed positions (e.g., ten positions) of the material for metal porous body 10.

It is preferable that the average wire diameter Dw of the wire material 11 be not less than 0.05 mm and not more than 2.00 mm. If the average wire diameter Dw is 0.1 mm or larger, the coil shape can be easily formed and the productivity of the material for metal porous body 10 is high. Accordingly, the average wire diameter Dw is preferably 0.1 mm or larger. If the average wire diameter Dw of the wire material 11 is less than 0.05 mm, since the wire material 11 is thin and the manufacturing difficulty of the coil shape is high and it is not suitable for mass production.

Figure 5:
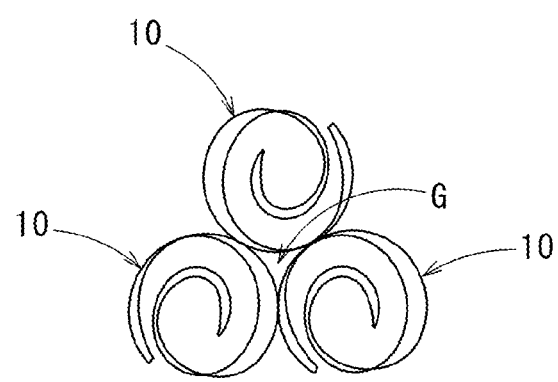
FIG. 5 It is a schematic view explaining a space formed by stacking the plurality of materials for metal porous body.

If the average wire diameter Dw of the wire material 11 is more than 2.00 mm, an interval G between the materials for metal porous body 10 in contact with each other tends to large when the materials for metal porous body 10 are stacked as schematically shown in FIG. 5. As a result, it is concerned that a porosity of the metal porous body 101 is far from an assumption from a porosity Q (mentioned later) of the material for metal porous body 10, and the porosity cannot be stably controlled.

As shown in FIG. 1, The material for metal porous body 10 made of the wire material 11 described above has a plurality of coil parts 12. Where a number (a winding number) of the coil parts 12 is N, the winding number N in the material for metal porous body 10 is 1 to 10 inclusive. In FIG. 1, the material for metal porous body 10 is provided with the coil parts 12 of a length of 2.5 wounds (N=2.5). If the winding number N is less than 1, it is hard to obtain a three-dimensional coil shape, so that it is difficult to maintain a sufficient pore size and the porosity when arranging the material for metal porous body 10. If the winding number N is more than 10, the manufacturing difficulty of the coil shape is high, so that the manufacturing cost is high and it is not suitable for the mass production.

A length L (mm) of the whole material for metal porous body 10 is preferably not less than 1 mm and not more than 20 mm. The coil length L is too short if it is less than 1 mm: it is difficult to convey the material for metal porous body 10 with stably maintaining the posture (a position and a direction) when conveying by a feeder and the like. If the coil length L is more than 20 mm, the position and the direction of the material for metal porous body 10 are unstable while conveying, and it is difficult to convey the material for metal porous body 10 with stably maintaining the posture.

Since it is difficult to measure an outer diameter D of each of the coil parts 12 as a circular outer diameter, the coil outer diameter D of the coil parts 12 is a dimension which can obtained by two points positioned outermost in about one winding of the coil parts 12 opposing with 180° measuring in a direction perpendicular to the length direction of the coil parts 12. An average coil outer diameter Dc is a value dividing a total sum of the outer diameter D of the coil parts 12 by the winding number N.

The average coil outer diameter Dc (mm) of the material for metal porous body 10 is preferably formed to be not less than 0.5 mm and not more than 10.0 mm. If the average coil outer diameter Dc is less than 0.5 mm, it is difficult to hold the material for metal porous body 10 by a robotic arm and the like when treating it, so that it is hard to arrange it in an intended position and direction. If the average coil outer diameter Dc is more than 10.0 mm, the interval G between the materials for metal porous body 10 being in contact with each other tends to be large when the materials for metal porous body 10 are aligned (refer to FIG. 5). As a result, it is concerned that the porosity of the metal porous body 101 is far from an assumption from the porosity Q of the material for metal porous body 10, and the porosity cannot be stably controlled.

As described above, since the material for metal porous body 10 is formed to be twisted as a whole, the coil outer diameter D of the coil parts 12 is easily formed to have different sizes between one and the other end. However, because the material for metal porous body 10 has the average coil outer diameter Dc is in the above range 0.5 mm to 10.0 mm inclusive, it is possible to form the shape of the average coil parts 12 to be a suitable size for controlling the interval G considering handling property and the arrangement.

The coil parts 12 are included in embodiments of the present invention if the shape thereof is formed not only in a strict circle shape, but also various shapes such as an oval, a polygon, and the like. The axis direction through the centers of the coil parts 12 may be a straight as shown in the axis D in FIG. 1, or may be a curved axis such as an arc shape. A winding direction of the coil parts 12 may be one as a right direction or a left direction, or may be changed in a middle of the direction of the coil length L.

An aspect ratio (L/Dc) of the average coil outer diameter Dc and the coil length L is preferably not less than 0.1 and not more than 10.0. If the aspect ratio (L/DC) is less than 0.1 or more than 10.0, it may be difficult to stably arrange the material for metal porous body 10 depending on the position and the direction. As a result, it is difficult to manufacture the metal porous body 101 having desired directionality.

As shown in FIG. 1 and FIG. 3, it is preferable that a pitch ratio (P/Dw) of a pitch P and the average wire diameter Dw be not less than 1 and not more than 50, where the pitch P is an interval between turns in a direction of the coil length L in the material for metal porous body 10. Although the most coil parts 12 have the different pitches P respectively, it is preferable that the pitch ratio (P/Dw) be not less than 1 and not more than 50 in each of the coil parts 12.

If the pitch ratio (P/Dw) is less than one, the pitch P is smaller than the average wire diameter Dw and opening of the coil shape of the material for metal porous body 10 is too small. As a result, the materials for metal porous body 10 are less entangled when combined. Accordingly, when the metal porous body 101 is manufactured, there are few joined portions of the materials for metal porous body 10 with each other and the strength is low, so that stability of the shape may be deteriorated.

If the pitch ratio (P/Dw) is more than 50, the pitch P is too large, so that the coil shape of the other material for a metal porous material 10 easily enters in the coil shape of the material for metal porous body 10. As a result, it is concerned that the porosity of the metal porous body 101 is far from an assumption from the porosity of the material for metal porous body 10, and the porosity cannot be stably controlled.

Figure 6:
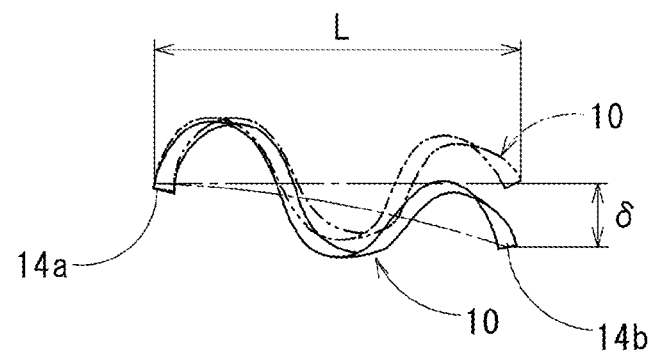
FIG. 6 It is a schematic view explaining a deflection amount of the material for metal porous body.

As shown in FIG. 6, it is preferable that in a state in which one end 14a thereof along a direction following the coil length L is supported in a cantilever manner and the other end 14b is deflected with a deflection amount δ (mm) by an own weight, a deflection ratio (δ/L) of the coil length L and the deflection amount δ be not more than 0.20. If the deflection ratio (δ/L) is more than 0.20 (20%), it is easy to be deformed when handled by a robotic arm and the like.

The porosity Q of the material for metal porous body 10 is calculated as follows. First, an occupied volume Vc (mm³) and a material volume Vw (mm³) of the material for metal porous body 10 are respectively calculated as follows;

$$Vc = L \times \pi \times (Dc/2)^2$$

$$Vw = [\pi \times (Dw/2)^2] \times (Dc-Dw) \times \pi \times N$$

where the coil length is L, the coil winding number is N, and the average coil outer diameter is Dc in the material for metal porous body 10; and the average wire diameter is Dw in the wire material 11.

The porosity Q of the material for a porous body 10 is calculated as follows, from the occupied volume Vc and the material volume Vw calculated as above;

$$Q = (1 - Vw/Vc) \times 100$$

The porosity Q of the material for metal porous body 10 is preferably not less than 30.0% and not more than 99.9%.

In a case in which the porosity Q of the material for metal porous body 10 is set to be smaller than 30.0%, inside of the coil shape (an inner diameter of the coil) is small. Accordingly, it is difficult to manufacture the metal porous body 10 having a sufficient space. If the porosity Q is larger than 99.9%, the strength of the material for metal porous body 10 is deteriorated, and it is concerned to be broken while conveying by the feeder and the like.

For the wire material 11 forming the material for metal porous body 10, a wire-string material and cut pieces generated by cutting machining by milling machine and the like can be used. The wire-string material may form a cross sectional shape other than a circle by a draw die.

Figure 7:
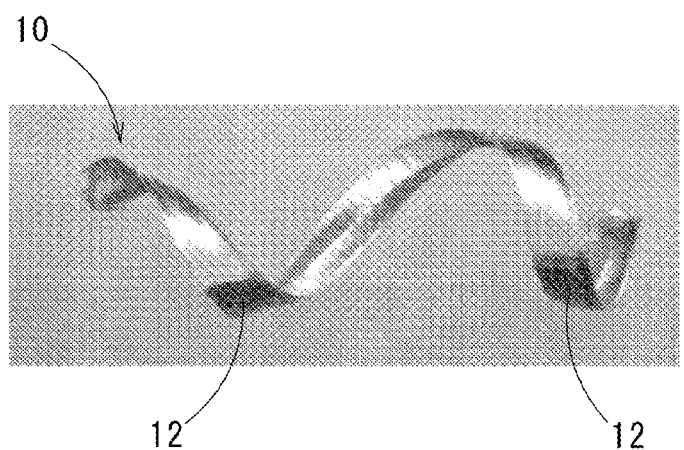
FIG. 7 It is a photograph of the material for metal porous body.
Figure 8:
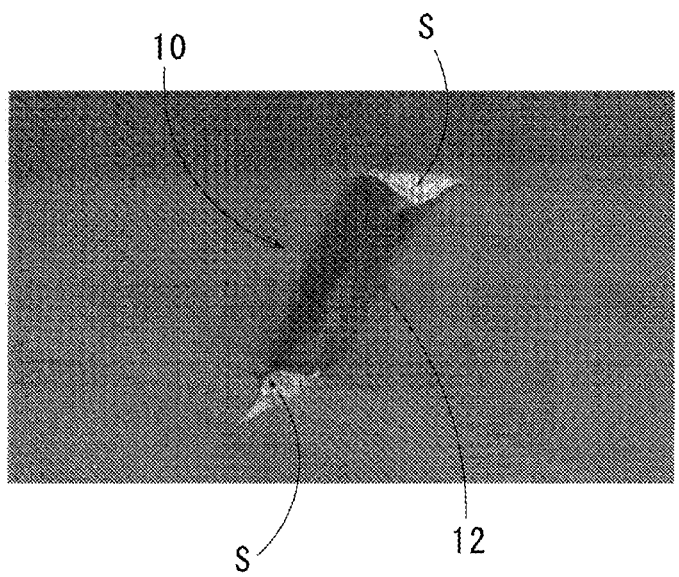
FIG. 8 It is a photograph in a lateral cross section of the material for metal porous body.

Photographs of the material for metal porous body 10 made of the cut piece is shown in FIG. 7 and FIG. 8. FIG. 7 shows the whole of the material for metal porous body 10. FIG. 8 shows a cross sectional shape of the material for metal porous body 10. The material for metal porous body 10 made of the cut piece can be formed with specifying the cross sectional shape (a lateral cross section) of the wire material 11 by a form of a cutting edge of a cutting tool, especially a form of a flank of the cutting edge, cutting property of a cut work, cutting condition and the like. However, the cross sectional shape is not constant.

The cross sectional shape of the wire material 11 is not limited to a circle and the like which can be obtained by minutely machining and may be undefined forms having the plurality of corner parts 13 as in this material for metal porous body 10. In this case, in the cross section of the wire material 11, the surfaces between the corner parts 13 may be formed of flat surfaces, curved surfaces, and slightly uneven curved surfaces and the like: it is a polygon having six or less corner parts 13 as a whole.

—Structure of Metal Porous Body—

Next, the metal porous body 101 (FIG. 9) consisting of the materials for metal porous body 10 formed as above will be explained. The metal porous body 101 is formed by combining and sintering the plurality of materials for metal porous body 10 as shown in FIG. 9.

In order to manufacturing the metal porous body 101 shown in FIG. 9, for example in a case in which the materials for metal porous body 10 are aluminum, by a mold or the like (not illustrated), the plurality of materials for metal porous body 10 are aligned in one row at the same posture with the coil length L direction (the axis direction) are together, and so that a plurality of rows are aligned in parallel so as to arrange them in flat. The rows may be sterically stacked in a height direction.

At this time, since the materials for metal porous body 10 are formed in the coil shape, it is easy to handle them. Accordingly, without careful attention, the plurality of materials for a porous metal body 10 can be arranged, stacked and fill at any position and in any direction by a feeder, a robotic arm, and the like. As a result, it is easy to control the distribution of the materials for metal porous body 10 in the mold.

Although omitting illustrations, specifically, the material for metal porous body 10 can be relatively conveyed easily by equipment for feeding parts (a part feeder). Since the material for metal porous body 10 is formed in the coil shape, although the materials for metal porous body 10 are concerned to be entangled, these are respectively picked out easily by using a standard disentangling device for springs.

In the parts feeder, the materials for metal porous body 10 are conveyed through a round conveying path, and aligned in a prescribed direction while conveying. Accordingly, by storing the materials for metal porous body 10 fed from the part feeder with aligning in a line, it is possible to maintain the certain posture of the materials for metal porous body 10 and to handle the materials for metal porous body 10 easily.

As described above, after filling the mold with the materials for metal porous body 10 by the feeder or the robotic arm, the materials for metal porous body 10 stuffed in the mold are heated, for example, at 600° C. for 0.5 to 60 minutes in an inert atmosphere. Thereby, contact parts between the materials for metal porous body 10 are sintered, the metal porous body 101 in which the materials for metal porous body 10 are integrally bonded with sintered parts (metallurgically bonded parts) therebetween is manufactured.

The materials for metal porous body 10 may be bonded by bonding material such as solder or the like. In a case in which the materials for metal porous body 10 are made of metal material having good sinterability such as aluminum, aluminum alloy, copper, copper alloy or the like, it is possible to sinter the materials for metal porous body 10 without additive assisting in sintering. In order to improve the sinterability, powder of magnesium or silicon may be adhered by binders. In the embodiment of the present invention, the sintered parts, the solder bonded parts, and the like are called metallurgically bonded parts.

In the metal porous body 101 formed as above described, since the plurality of materials for metal porous body 10 are arranged at the same posture in the direction of the coil length L, pores having directionality along the direction of the coil length L are formed. By combining the plurality of the materials for metal porous body 10 formed in the coil shape, it is easy to manufacture the metal porous body 101 having the anisotropy (directionality). Since it is possible to freely control the porosity and the like only by changing the average wire diameter Dw and the like of the wire material 10 of the material for metal porous body 10 forming the metal porous body 101, flexibility of product design is high.

In the metal porous body 101, since the materials for metal porous body 10 are bonded by the sintered parts therebetween, thermal stress at bonding boundary surfaces is small and the heat can smoothly moves between the materials for metal porous body 10. Since the spaces (the pores) are formed inside the materials for metal porous body 10 which are formed into the coil shape, the heat medium can flow through the spaces and liquid can be impregnated here. By combining the materials for metal porous body 10 formed in the coil shape, it is possible to control the porosity, the pore size, mechanical characteristics, thermal characteristics, sound absorption characteristics, fluid passing characteristics, liquid impregnation characteristics and the like of the metal porous body 101.

Figure 10:
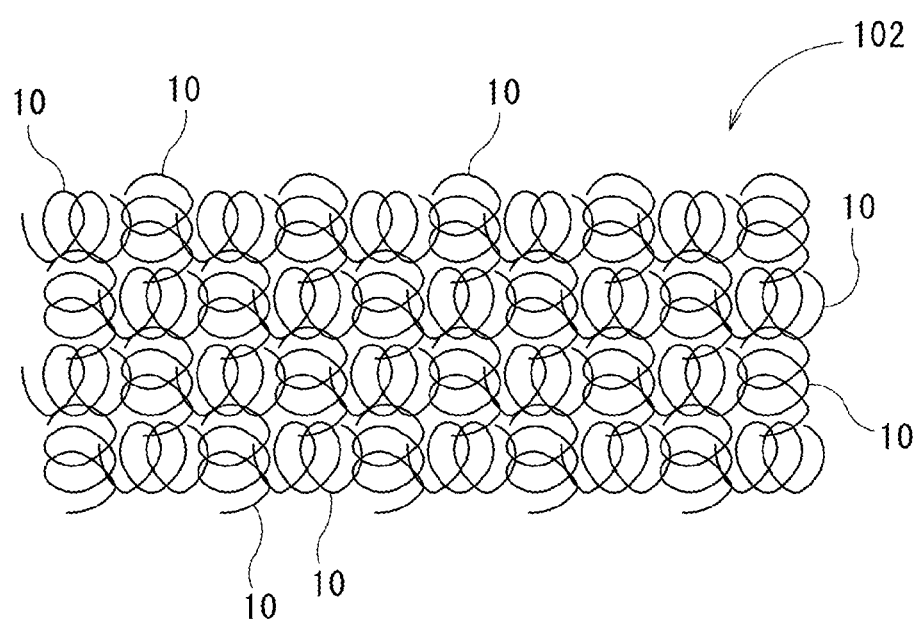
FIG. 10 It is a schematic view explaining a metal porous body in another embodiment.
Figure 11:
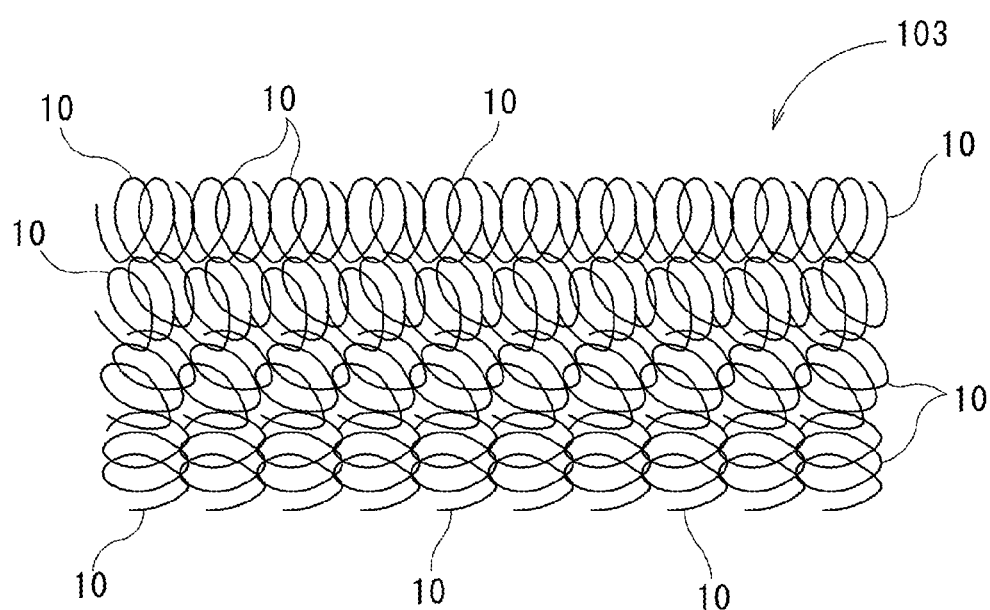
FIG. 11 It is a schematic view explaining a metal porous body in another embodiment.

In the above embodiment, the metal porous body 101 having the anisotropy (the directionality) is explained. However, as shown in FIG. 10, by arranging and combining the materials for metal porous body 10 in different directions, a metal porous body 102 having isotropy (without the directionality) can be easily formed. As shown in FIG. 11, by combining the coil-shaped materials for metal porous body 10, a metal porous body 103 can be easily formed to have lopsidedness in a direction of flow of the fluid. In the metal porous body 103 shown in FIG. 11, the lopsidedness is given by arranging the axis of the coil in the material for metal porous body 10 to be a lateral direction to a vertical direction from an upper to lower of the drawing.

The present invention is not limited to the above-described embodiments and various modifications may be made without departing from the scope of the present invention.

Examples

As Examples of the present invention, the followings were made:
(1) Samples Nos. 1 to 12 of the metal porous body using the materials for metal porous body made of wire material made of aluminum; and
(2) Samples Nos. 13 to 15 of the metal porous body using the materials for metal porous body made of aluminum made by cutting machining.
Conditions, such as dimensions, of the material for metal porous body and the metal porous body are shown in Table 1 and Table 2.

Each of the metal porous bodies was formed by arranging the materials for metal porous body to have the isotropy so that the axis direction of the coils are alternate in the vertical direction and the lateral direction (refer to FIG. 10), in a size of vertical 50 mm×lateral 30 mm×height 30 mm. The cross sectional shape (the cross section) of Samples Nos. 1 to 12 of the material for metal porous body (the wire material) made of the wire string material is a circle. The cross sectional shape of Samples Nos. 13 to 15 of the material for metal porous body (the wire material) made by the cutting machining is a triangle.

TABLE 1

|  | Sample No. | Coil Length L (mm) | Average Coil Outer Diameter Dc (mm) | Average Wire Diameter Dw (mm) | Winding Number N |
|---|---|---|---|---|---|
| (1) | 1 | 5 | 5 | 0.35 | 4 |
|  | 2 | 10 | 5 | 0.35 | 6 |
|  | 3 | 7.5 | 5 | 0.2 | 5.5 |
|  | 4 | 10 | 5 | 0.5 | 7 |
|  | 5 | 10 | 5 | 0.5 | 5 |
|  | 6 | 10 | 5 | 0.5 | 8 |
|  | 7 | 5 | 5 | 0.35 | 4 |
|  | 8 | 10 | 5 | 0.35 | 6 |
|  | 9 | 7.5 | 5 | 0.2 | 5.5 |
|  | 10 | 10 | 5 | 0.5 | 7 |

TABLE 1-continued

| Sample No. | | Coil Length L (mm) | Average Coil Outer Diameter Dc (mm) | Average Wire Diameter Dw (mm) | Winding Number N |
|---|---|---|---|---|---|
| | 11 | 10 | 5 | 0.5 | 5 |
| | 12 | 10 | 5 | 0.5 | 8 |
| (2) | 13 | 8.7 | 3.1 | 0.28 | 1.5 |
| | 14 | 7.8 | 2.3 | 0.29 | 1.4 |
| | 15 | 8.5 | 2.7 | 0.2 | 1.5 |

TABLE 2

| Sample No. | | Porosity Q (%) of Material for Metal Porous Body | Aspect Ratio (L/Dc) | Pitch Ratio (P/Dw) | Porosity (%) of Metal Porous Material |
|---|---|---|---|---|---|
| (1) | 1 | 94.3 | 1 | 3.6 | 99.5 |
| | 2 | 95.7 | 2 | 4.8 | 99.6 |
| | 3 | 98.2 | 1.5 | 6.8 | 99.7 |
| | 4 | 90.1 | 2 | 2.9 | 99.4 |
| | 5 | 92.9 | 2 | 4.0 | 99.5 |
| | 6 | 88.7 | 2 | 2.5 | 99.2 |
| | 7 | 94.3 | 1 | 3.6 | 93.3 |
| | 8 | 95.7 | 2 | 4.8 | 95.2 |
| | 9 | 98.2 | 1.5 | 6.8 | 96.7 |
| | 10 | 90.1 | 2 | 2.9 | 92.3 |
| | 11 | 92.9 | 2 | 4.0 | 93.4 |
| | 12 | 88.7 | 2 | 2.5 | 90.6 |
| (2) | 13 | 98.8 | 2.8 | 20.7 | 85.1 |
| | 14 | 98.2 | 3.4 | 19.2 | 77.9 |
| | 15 | 99.2 | 3.1 | 28.3 | 90.4 |

As shown in Table 1 and Table 2, by combining the coil-shape materials for metal porous body, the metal porous body was able to be formed to have the prescribed porosity.

Next, using the material for metal porous body of Sample No. 13, Samples Nos. 21 to 23 of the metal porous bodies in which the directionality of the pores were controlled were made. The metal porous bodies of Nos. 21 to 23 were made to have a size vertical 38 mm×lateral 55 mm×height 6 mm and a porosity 90%.

In the metal porous body of Sample No. 21, the materials for metal porous body were arranged so that the axis direction (the direction of the coil length L) of the coil to be parallel to the lateral direction (55 mm) so that the metal porous body had a lateral directionality. In the metal porous body of Sample No. 22, the materials for metal porous body were arranged so that the axis direction of the coil to be parallel to the vertical direction (38 mm) so that the metal porous body had a vertical directionality. The metal porous body of Sample No. 23, the materials for metal porous body were arranged so that the axis direction of the coil to be alternate of the vertical direction and the lateral direction (refer to FIG. 10), so that the metal porous body had isotropy.

For these metal porous bodies of Sample Nos. 21 to 23, pressure loss was measured when water flowed from one end surface to the other end surface of 38 mm×6 mm (in the lateral direction). The measurements of the pressure loss were carried out with flow rates of water entered from the one end surface as 2.1 (m/s) and 4.3 (m/s). The pressure loss (kPa) was measured as a pressure difference between a pressure at the entering one end surface and a pressure at the exiting other end surface. The results are shown in Table 3.

TABLE 3

| | Pressure Loss (kPa) | |
|---|---|---|
| Sample No. | 2.1 (m/s) | 4.3 (m/s) |
| 21 | 0.14 | 0.46 |
| 22 | 0.31 | 1.02 |
| 23 | 0.23 | 0.75 |

As known from the results of Table 3, the pressure loss in No. 21 was the smallest in the three because the materials for metal porous body were arranged so that the axis direction of was the same direction as the flow of water (the lateral direction). The pressure loss in No. 22 was the largest in the three because the axis direction of the materials for metal porous body was perpendicular to the flow direction of the water (the vertical direction). The pressure loss in No. 23 was a medium value between No. 21 and No. 22 because the axis directions of the materials for metal porous body were random by mixing of the vertical direction and the lateral direction. As recognized from these results, by the plurality of materials for metal porous body combined so that the arrangements thereof are different, the metal porous bodies having different orientations (the directionality of a fluid flowing) can be formed.

INDUSTRIAL APPLICABILITY

The material for metal porous body having various purposes can be provided and the directionality of the metal porous body (isotropy, anisotropy, and the lopsidedness) can be easily controlled.

REFERENCE SIGNS LIST

10 Material for metal porous body
11 Wire material

12 Coil part
13 Corner part
14a One end
14b Other end
101, 102, 103 Metal porous body
G Interval
R Radius curvature
S Section area
δ Deflection amount

The invention claimed is:

1. A material for metal porous body for composing a metal porous body having a plurality of pores, which is a wire material having a coil shape wound in a helical shape, wherein
the wire material has an average wire diameter Dw of not less than 0.05 mm and not more than 2.00 mm;
the coil shape has an average coil outer diameter Dc of not less than 0.5 mm and not more than 10.0 mm, a coil length L of not less than 1 mm and not more than 20 mm, and a coil winding number N of not less than 1 and not more than 10;
wherein the material for metal porous body in a state in which one end thereof along a direction following the coil length L is supported in a cantilever manner and the other end is deflected with a deflection amount δ by its own weight,
a deflection ratio (δ/L) of the coil length L and the deflection amount δ is not more than 0.20.

2. The material for metal porous body according to claim 1, wherein an aspect ratio (L/Dc) of the average coil outer diameter Dc and the coil length L be not less than 0.1 and not more than 10.0.

3. The material for metal porous body according to claim 1, wherein a porosity of the material for metal porous body Q (%) is not less than 30.0% and not more than 99.9%, where
an occupied volume Vc (mm$^3$) is $[L \times \pi \times (Dc/2)^2]$;
a material volume Vw (mm$^3$) is $\{[\pi \times (Dw/2)^2] \times (Dc-Dw) \times \pi \times N\}$; and
the porosity Q (%) is $[1-(Vw/Vc)] \times 100$.

4. The material for metal porous body according to claim 1, wherein
a pitch ratio (P/Dw) of a pitch P and the average wire diameter Dw is not less than 1 and not more than 50, where the pitch P is an interval between turns in a direction of the coil length L.

5. The material for metal porous body according to claim 1, wherein a cross sectional shape of the wire material is a polygon having six or less corner parts and a curvature radius of each of the corner parts is not more than 0.1 mm.

6. The metal porous body formed by combining and sintering the material for metal porous body according to claim 1.

7. The material for metal porous body according to claim 2, wherein a porosity of the material for metal porous body Q (%) is not less than 30.0% and not more than 99.9%, where
an occupied volume Vc (mm$^3$) is $[L \times \pi \times (Dc/2)^2]$;
a material volume Vw (mm$^3$) is $\{[\pi \times (Dw/2)^2] \times (Dc-Dw) \times \pi \times N\}$; and
the porosity Q (%) is $[1-(Vw/Vc)] \times 100$.

8. The material for metal porous body according to claim 2, wherein
a pitch ratio (P/Dw) of a pitch P and the average wire diameter Dw is not less than 1 and not more than 50, where the pitch P is an interval between turns in a direction of the coil length L.

9. The material for metal porous body according to claim 3, wherein
a pitch ratio (P/Dw) of a pitch P and the average wire diameter Dw is not less than 1 and not more than 50, where the pitch P is an interval between turns in a direction of the coil length L.

10. The material for metal porous body according to claim 2, wherein a cross sectional shape of the wire material is a polygon having six or less corner parts and a curvature radius of each of the corner parts is not more than 0.1 mm.

11. The metal porous body formed by combining and sintering the material for metal porous body according to claim 2.

* * * * *